(12) United States Patent
Huang et al.

(10) Patent No.: US 12,431,669 B2
(45) Date of Patent: Sep. 30, 2025

(54) ELECTRICAL CONNECTOR WITH IMPROVED SHIELDING PERFORMANCE AND OPTIMIZED TERMINAL ARRANGEMENT

(71) Applicant: Luxshare Precision Industry Company Limited, Shenzhen (CN)

(72) Inventors: Yu Huang, Shenzhen (CN); Chenhui Zeng, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 311 days.

(21) Appl. No.: 18/209,733

(22) Filed: Jun. 14, 2023

(65) Prior Publication Data
US 2024/0145999 A1    May 2, 2024

(30) Foreign Application Priority Data
Oct. 31, 2022  (CN) .......................... 202211345113.6

(51) Int. Cl.
*H01R 13/6582*   (2011.01)
*H01R 13/24*     (2006.01)
(Continued)

(52) U.S. Cl.
CPC ..... *H01R 13/6582* (2013.01); *H01R 13/2407* (2013.01); *H01R 13/405* (2013.01); *H01R 13/516* (2013.01)

(58) Field of Classification Search
CPC ............................................... H01R 13/6582
(Continued)

(56) References Cited

U.S. PATENT DOCUMENTS

D583,766 S   12/2008  Chiang
D647,860 S   11/2011  Wang
(Continued)

FOREIGN PATENT DOCUMENTS

CN   202759080 U   2/2013
CN   206401801 U   8/2017
(Continued)

OTHER PUBLICATIONS

Inakustik, "Inakustik Excellence Profi HDMI plug," AV-Connection, Retrieved Online: https://www.av-connection.com/?PGr=8123, retrieved on Dec. 10, 2024, 1 page total.
(Continued)

*Primary Examiner* — Phuong K Dinh
(74) *Attorney, Agent, or Firm* — Birch, Stewart, Kolasch & Birch, LLP

(57) ABSTRACT

An electric connector includes an insulating body, a first terminal module, a second terminal module and a shielding sheet. The first terminal module includes a first insulating block and a number of first conductive terminals. Each first conductive terminal includes a first fixing portion, a first tail portion and a first elastic arm. The first conductive terminals include a first terminal, a second terminal and a third terminal. The first elastic arm of the first terminal, the first elastic arm of the second terminal and the first elastic arm of the third terminal are sequentially disposed along a first direction. The first fixing portion of the third terminal includes a deflection portion such that the first tail portion of the third terminal, the first tail portion of the first terminal, and the first tail portion of the second terminal are sequentially disposed along the first direction.

20 Claims, 17 Drawing Sheets

(51) Int. Cl.
   *H01R 13/405* (2006.01)
   *H01R 13/516* (2006.01)
(58) Field of Classification Search
   USPC .................................................. 439/607.01
   See application file for complete search history.

(56) References Cited

U.S. PATENT DOCUMENTS

| | | | |
|---|---|---|---|
| D680,500 S | 4/2013 | Xie et al. | |
| D769,195 S | 10/2016 | Kim | |
| D772,165 S | 11/2016 | Chien et al. | |
| 10,236,632 B2 * | 3/2019 | Zhang | H01R 24/60 |
| 10,476,208 B1 | 11/2019 | Shen | |
| D982,527 S | 4/2023 | Li et al. | |
| D1,075,693 S | 5/2025 | Fan et al. | |
| 2011/0183545 A1 | 7/2011 | Guo et al. | |
| 2015/0044906 A1 | 2/2015 | Tian et al. | |
| 2020/0106204 A1 * | 4/2020 | Zhao | H01R 13/405 |
| 2021/0119374 A1 | 4/2021 | Wan et al. | |
| 2022/0123509 A1 | 4/2022 | Li et al. | |
| 2022/0123510 A1 | 4/2022 | Li et al. | |
| 2024/0145999 A1 | 5/2024 | Huang et al. | |
| 2024/0146000 A1 | 5/2024 | Fan et al. | |
| 2025/0112424 A1 | 4/2025 | Dan | |

FOREIGN PATENT DOCUMENTS

| | | |
|---|---|---|
| CN | 304265482 | 9/2017 |
| CN | 107305985 A | 10/2017 |
| CN | 108306145 A | 7/2018 |
| CN | 109256643 A | 1/2019 |
| CN | 212412340 U | 1/2021 |
| CN | 112510442 A | 3/2021 |
| CN | 218887595 U | 4/2023 |
| JP | D1742625 | 4/2023 |
| KR | 300861278.0000 | 6/2016 |
| TW | M517436 U | 2/2016 |
| TW | 201834320 A | 9/2018 |
| TW | 202017253 A | 5/2020 |
| WO | WO 2021/143764 A1 | 7/2021 |

OTHER PUBLICATIONS

Oiyagi, "Oiyagai 5pcs HDMI Male Connector Gold Plated 19 Pin Repair Plug Soldering Wire Type Connectors Use for Electronics Repair," Amazon, Retreived Online: https://www.amazon.com/dp/B07CYJYL24, May 19, 2018, 2 pages total.
Penglin, "PENGLIN Pack of 20 USB Standard Micro Port Male Soldering Plugs, Micro USB 5-Pin Male Soldering Repair Replacement Adapter for DIY USB Power Supply," Amazon, Retreived Online: https://www.amazon.de/dp/BOCGNL26YZ, Aug. 26, 2023, 2 pages total.
U.S. Office Action for U.S. Appl. No. 29/881,388, dated Dec. 23, 2024.
U.S. Office Action for U.S. Appl. No. 29/881,388, dated May 28, 2025.

* cited by examiner

ELECTRICAL CONNECTOR WITH IMPROVED SHIELDING PERFORMANCE AND OPTIMIZED TERMINAL ARRANGEMENT

CROSS-REFERENCE TO RELATED APPLICATION

This patent application claims priority of a Chinese Patent Application No. 202211345113.6, filed on Oct. 31, 2022 and titled "electrical connector", the entire content of which is incorporated herein by reference.

TECHNICAL FIELD

The present disclosure relates to an electrical connector, which belongs to a technical field of connectors.

BACKGROUND

With the continuous improvement requirements for data transmission quality of electrical connectors, how to reduce the interference of conductive terminals during data transmission is a technical problem to be solved by those skilled in the art.

Besides, in the application of some electrical connectors, since the conductive terminals need to be soldered or welded to cables, as the density of the conductive terminals of the electrical connectors continues to increase, how to optimize the arrangement of the conductive terminals is also a technical problem to be solved by those skilled in the art.

SUMMARY

An object of the present disclosure is to provide an electrical connector with better shielding performance and optimized terminal arrangement.

In order to achieve the above object, the present disclosure adopts the following technical solution: an electrical connector, including: an insulating body including a mating surface, a mounting surface opposite to the mating surface, a mating slot extending through the mating surface, and an installation space extending through the mounting surface and communicating with the mating slot; a first terminal module, the first terminal module including a first insulating block and a plurality of first conductive terminals, each first conductive terminal including a first fixing portion fixed to the first insulating block, a first tail portion extending from one end of the first fixing portion, and a first elastic arm extending from another end of the first fixing portion; the first elastic arm being provided with a first contact portion extending into the mating slot; a second terminal module, the second terminal module including a second insulating block and a plurality of second conductive terminals, each second conductive terminal including a second fixing portion fixed to the second insulating block, a second tail portion extending from one end of the second fixing portion, and a second elastic arm extending from another end of the second fixing portion; the second elastic arm being provided with a second contact portion extending into the mating slot; the first contact portions of the plurality of first conductive terminals and the second contact portions of the second conductive terminals being located on opposite sides of the mating slot, respectively; and a shielding sheet, the shielding sheet including a main body and a plurality of grounding elastic arms extending from the main body, each grounding elastic arm including an abutting portion extending into the mating slot, the main body being at least partially clamped between the first insulating block and the second insulating block; wherein the plurality of first conductive terminals include a first terminal, a second terminal and a third terminal; the first elastic arm of the first terminal, the first elastic arm of the second terminal and the first elastic arm of the third terminal are disposed in sequence along a first direction; and the first fixing portion of the third terminal includes a deflection portion straddling the first fixing portion of the first terminal and the first fixing portion of the second terminal, so that the first tail portion of the third terminal, the first tail portion of the first terminal and the first tail portion of the second terminal are disposed in sequence along the first direction.

In order to achieve the above object, the present disclosure adopts the following technical solution: an electrical connector, including: an insulating body including a mating surface and a mating slot extending through the mating surface; a first terminal module, the first terminal module including a first insulating block and a plurality of first conductive terminals, each first conductive terminal including a first fixing portion fixed to the first insulating block, a first tail portion, and a first elastic arm; the first elastic arm being provided with a first contact portion extending into the mating slot; a second terminal module, the second terminal module including a second insulating block and a plurality of second conductive terminals, each second conductive terminal including a second fixing portion fixed to the second insulating block, a second tail portion, and a second elastic arm; the second elastic arm being provided with a second contact portion extending into the mating slot; the first contact portions of the plurality of first conductive terminals and the second contact portions of the second conductive terminals being located on opposite sides of the mating slot, respectively; and a shielding sheet, the shielding sheet including a main body and a plurality of grounding elastic arms extending from the main body, each grounding elastic arm including an abutting portion extending into the mating slot, the main body being at least partially located between the first insulating block and the second insulating block; wherein the plurality of first conductive terminals include a first terminal, a second terminal and a third terminal; the first elastic arm of the first terminal, the first elastic arm of the second terminal and the first elastic arm of the third terminal are disposed in sequence along a first direction; the first elastic arm of the second terminal extends beyond the first elastic arm of the first terminal along a second direction perpendicular to the first direction; the first elastic arm of the third terminal extends beyond the first elastic arm of the first terminal along the second direction; and the first elastic arm of the second terminal and the first elastic arm of the third terminal have a same length along the second direction; and the first fixing portion of the third terminal includes a deflection portion straddling the first fixing portion of the first terminal and the first fixing portion of the second terminal, so that the first tail portion of the third terminal, the first tail portion of the first terminal and the first tail portion of the second terminal are disposed in sequence along the first direction.

Compared with the prior art, the present disclosure reduces the crosstalk between the first terminal module and the second terminal module and improves the quality of signal transmission by providing the shielding sheet. In addition, the first fixing portion of the third terminal includes a deflection portion straddling the first fixing portion of the first terminal and the first fixing portion of the second terminal, so that an arrangement order of the first tail portion of the third terminal, the first tail portion of the first terminal, and the first tail portion of the second terminal disposed along the first direction is different from that of the first elastic arm of the first terminal, the first elastic arm of the second terminal, and the first elastic arm of the third terminal, thereby optimizing the arrangement of the first terminal, the second terminal and the third terminal.

DETAILED DESCRIPTION

Figure 1:
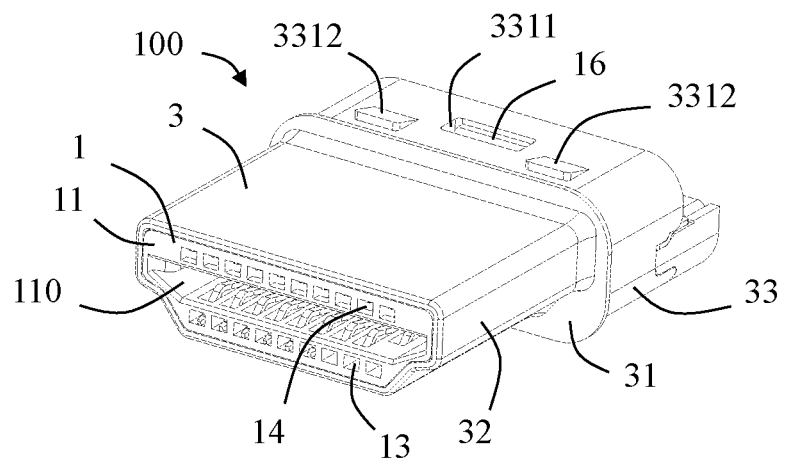
FIG. 1 is a schematic perspective view of an electrical connector in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 7, the present disclosure discloses an electrical connector 100, which includes an insulating body 1, a terminal module 2 at least partially installed in the insulating housing 1, and a metal shell 3 enclosing the insulating body 1. In the illustrated embodiment of the present disclosure, the electrical connector 100 is an HDMI cable connector. The electrical connector 100 is used for connecting with a plurality of cables 200. Of course, it is understandable to those skilled in the art that in other embodiments, the electrical connector 100 may also be other types of electrical connectors.

Figure 5:
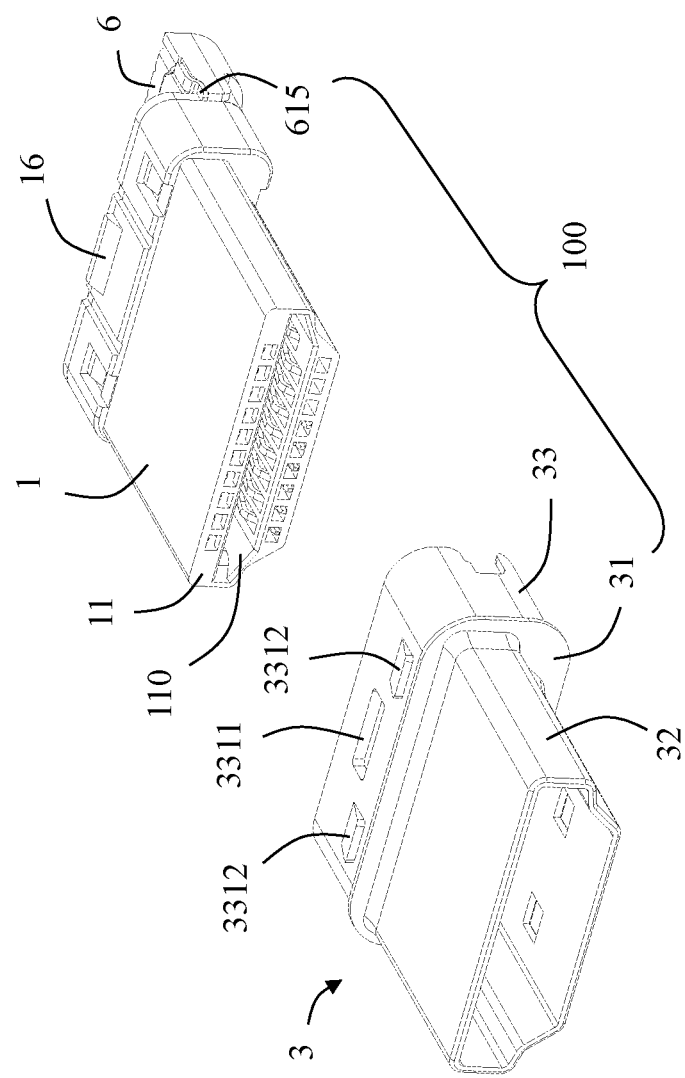
FIG. 5 is a partial perspective exploded view of FIG. 1.
Figure 6:
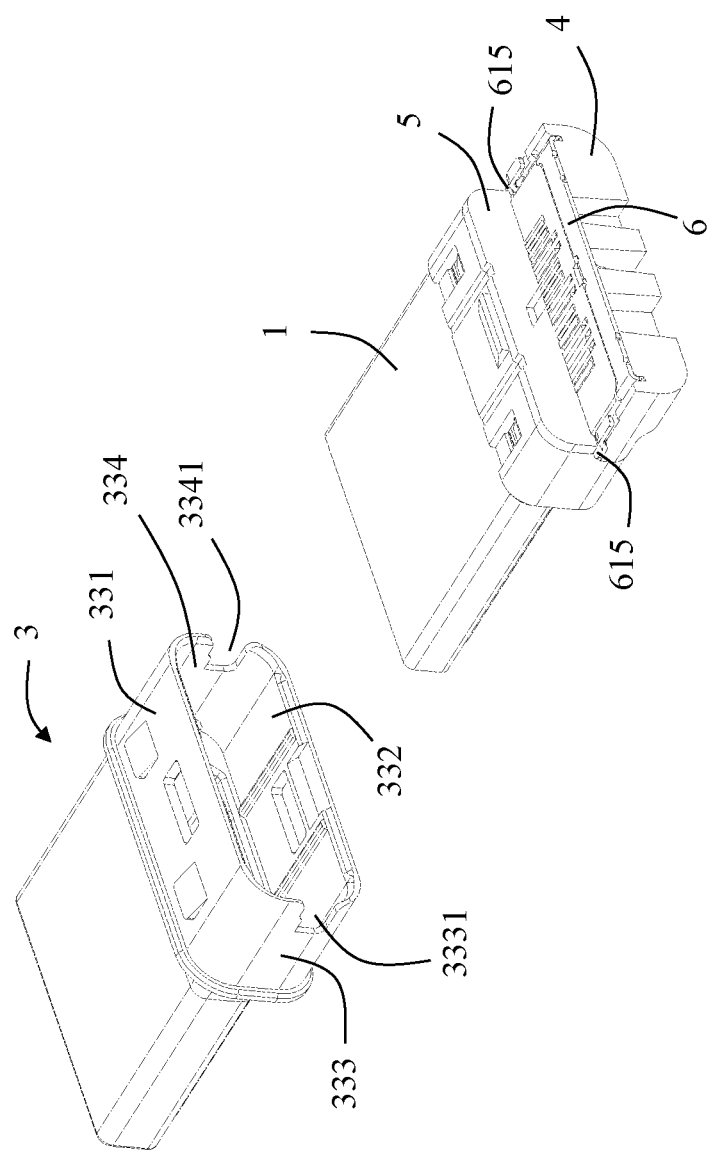
FIG. 6 is a partial perspective exploded view of FIG. 5 at another angle.

Referring to FIG. 1 to FIG. 6, in the illustrated embodiment of the present disclosure, the metal shell 3 has a one-piece structure made of metal material. The metal shell 3 includes a flange portion 31, a sleeve portion 32 extending forwardly from the flange portion 31, and a retaining portion 33 extending backwardly from the flange portion 31. In the illustrated embodiment of the present disclosure, the sleeve portion 32 has a shape and size in comply with the HDMI standard. The flange portion 31 protrudes outwardly from the sleeve portion 32 to play a position-limiting role, preventing the sleeve portion 32 from being excessively inserted into a mating connector (not shown). The retaining portion 33 is provided with a top wall 331, a bottom wall 332 opposite to the top wall 331, a first side wall portion 333 connecting the top wall 331 and the bottom wall 332 and being located on one side, and a second side wall portion 334 connecting the top wall 331 and the bottom wall 332 and being located on another side. The bottom wall 332 defines a first locking hole 3321 and a plurality of first protrusions 3322 located on opposite sides of the first locking hole 3321. The top wall 331 defines a second locking hole 3311 and a plurality of second protrusions 3312 located on opposite sides of the second locking hole 3311. Both the first locking hole 3321 and the second locking hole 3311 are used for locking with the terminal module 2 to prevent the terminal module 2 from detaching from the metal shell 3. A general concept of the first protrusion 3322 and/or the second protrusion 3312 is a protrusion. Referring to FIG. 6, the first side wall portion 333 defines a first notch 3331 extending backwardly through the retaining portion 33. The second side wall portion 334 defines a second notch 3341 extending backwardly through the retaining portion 33.

Figure 3:
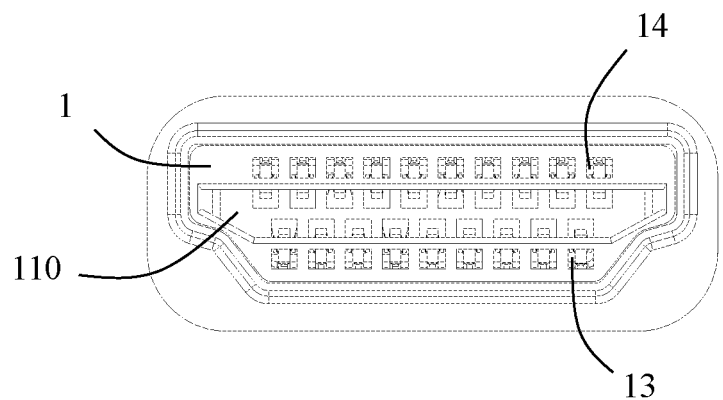
FIG. 3 is a front view of FIG. 1.
Figure 4:
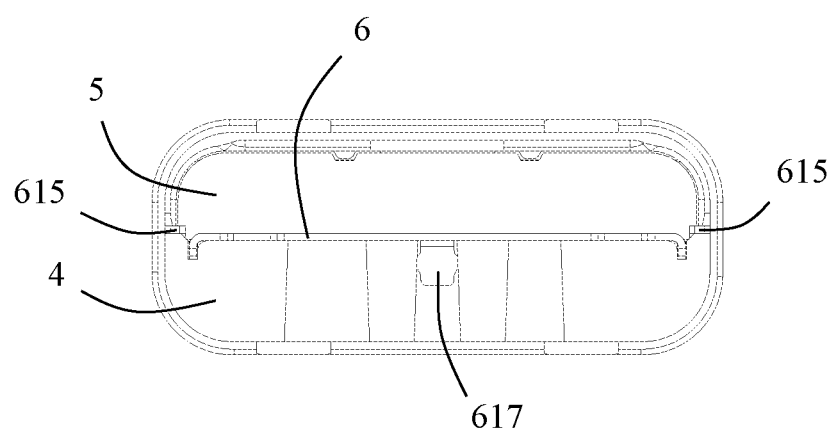
FIG. 4 is a rear view of FIG. 1.
Figure 7:
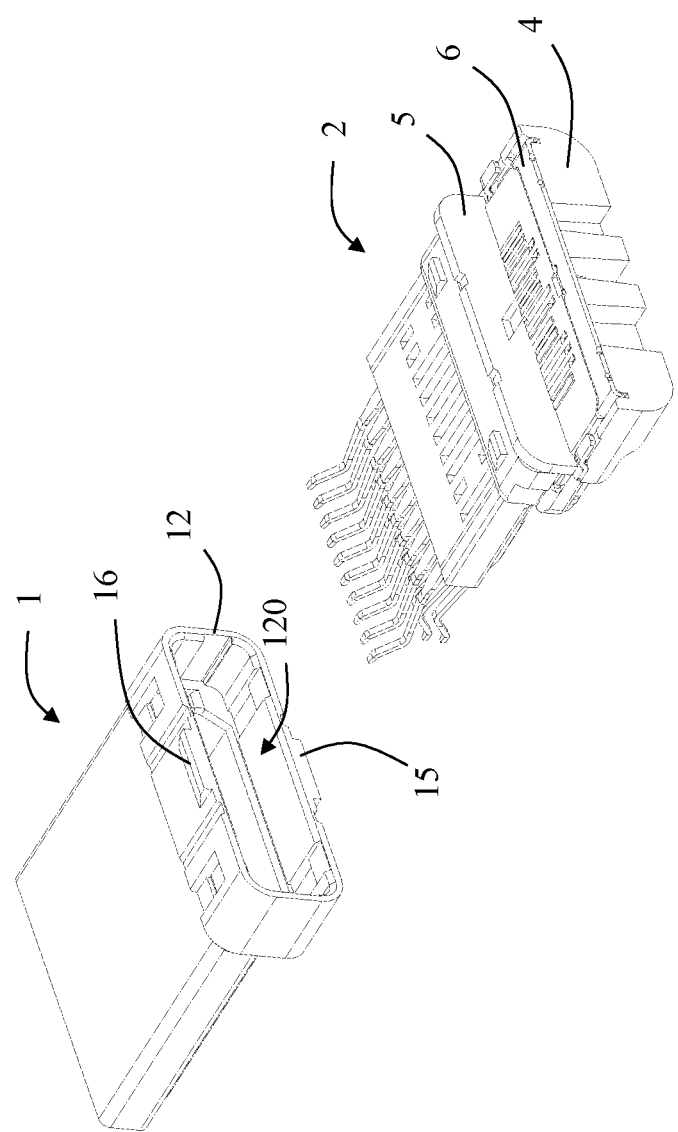
FIG. 7 is a perspective exploded view of a terminal module and an insulating body in FIG. 6.
Figure 8:
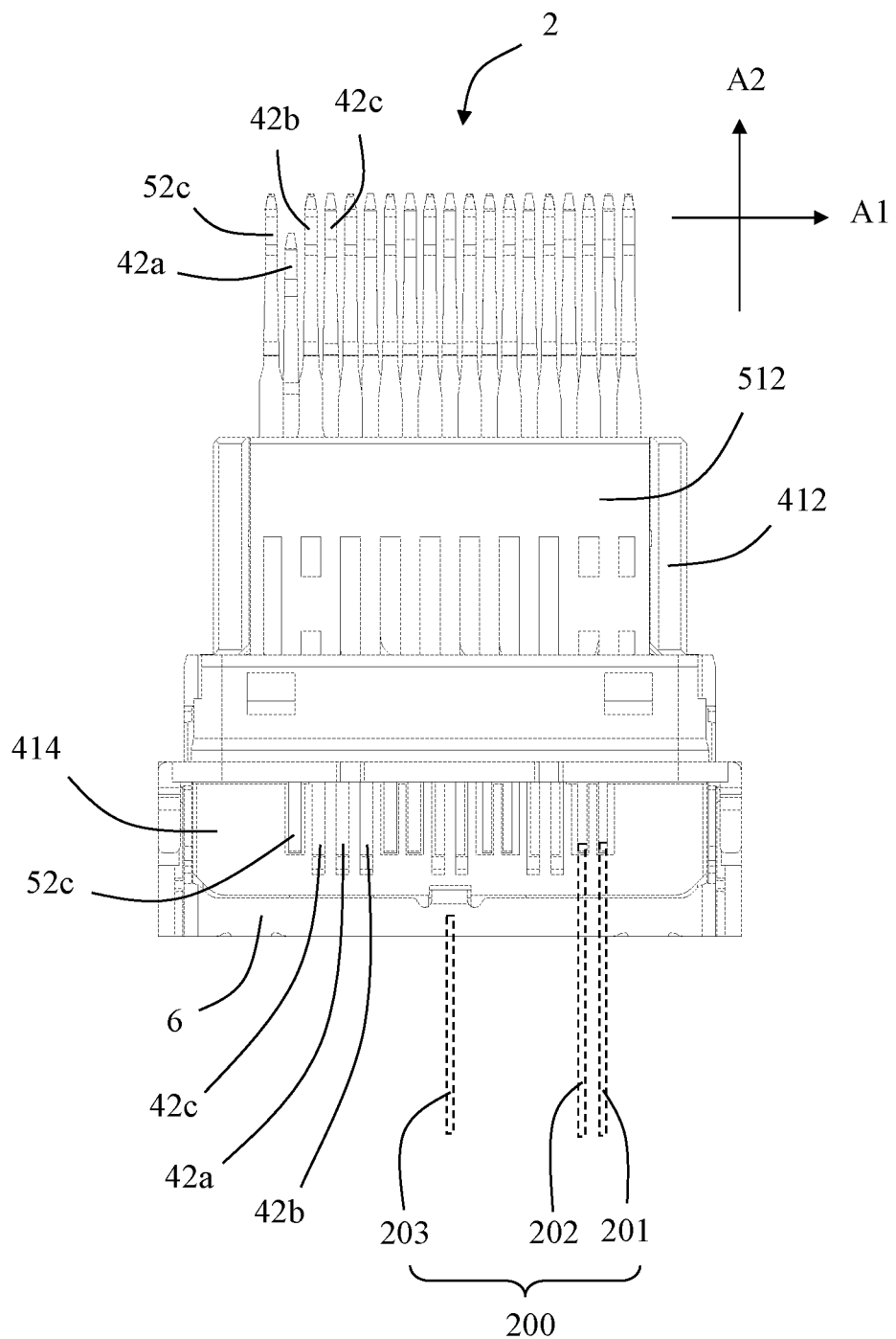
FIG. 8 is a top view of the terminal module in FIG. 7.
Figure 9:
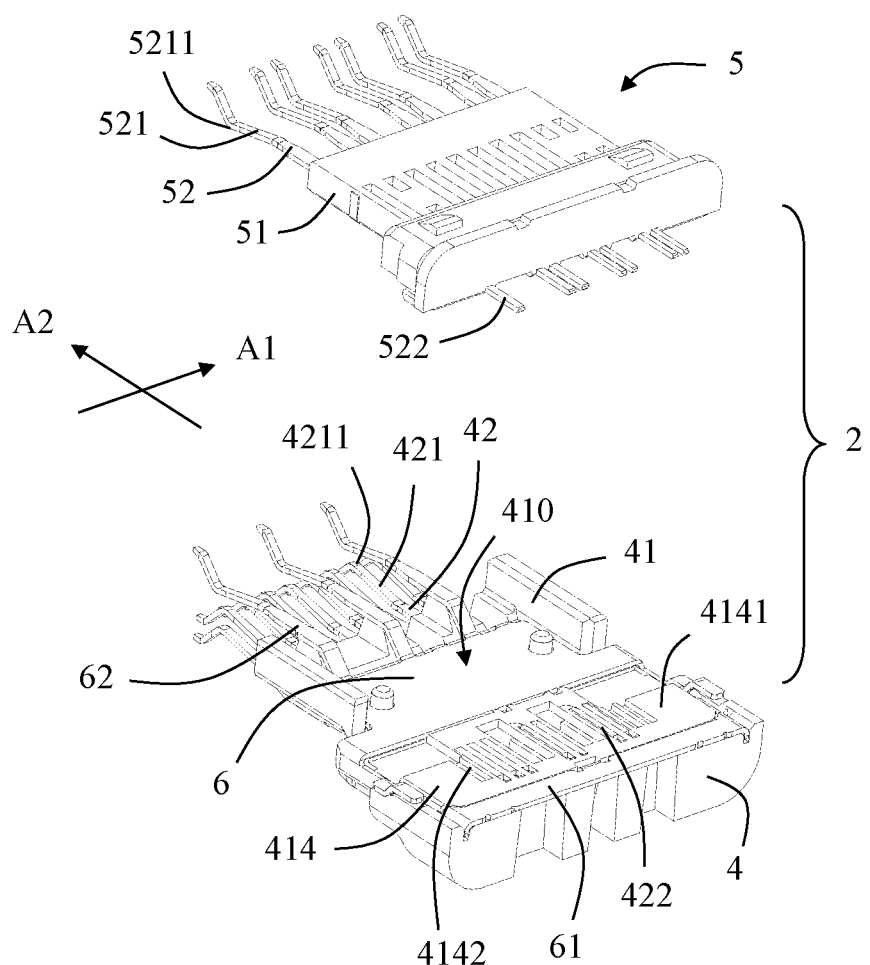
FIG. 9 is a partial perspective exploded view of the terminal module in FIG. 7.
Figure 10:
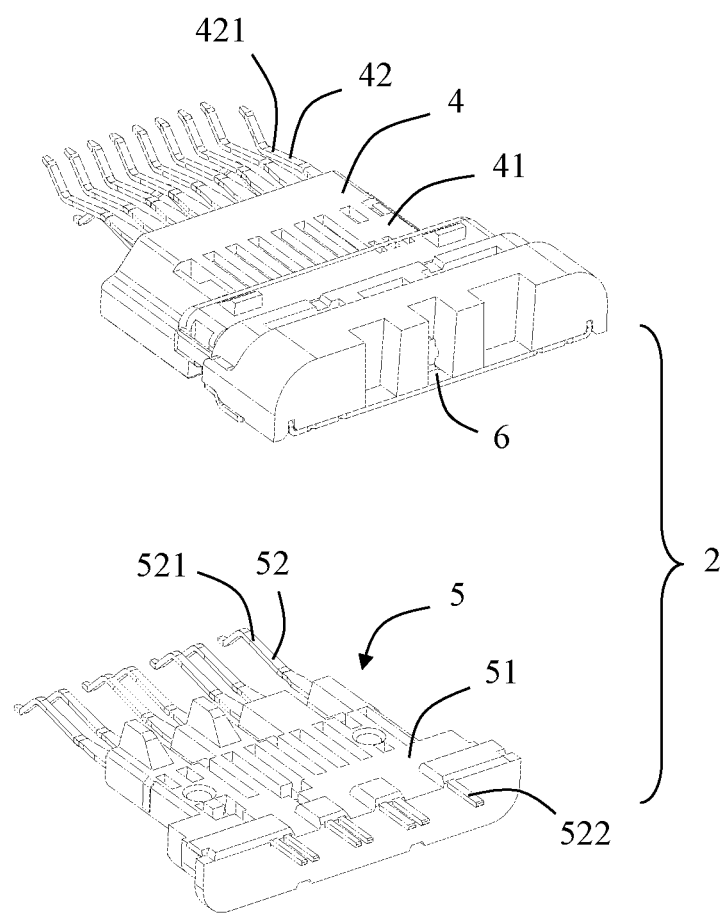
FIG. 10 is a partial perspective exploded view of FIG. 9 at another angle.
Figure 11:
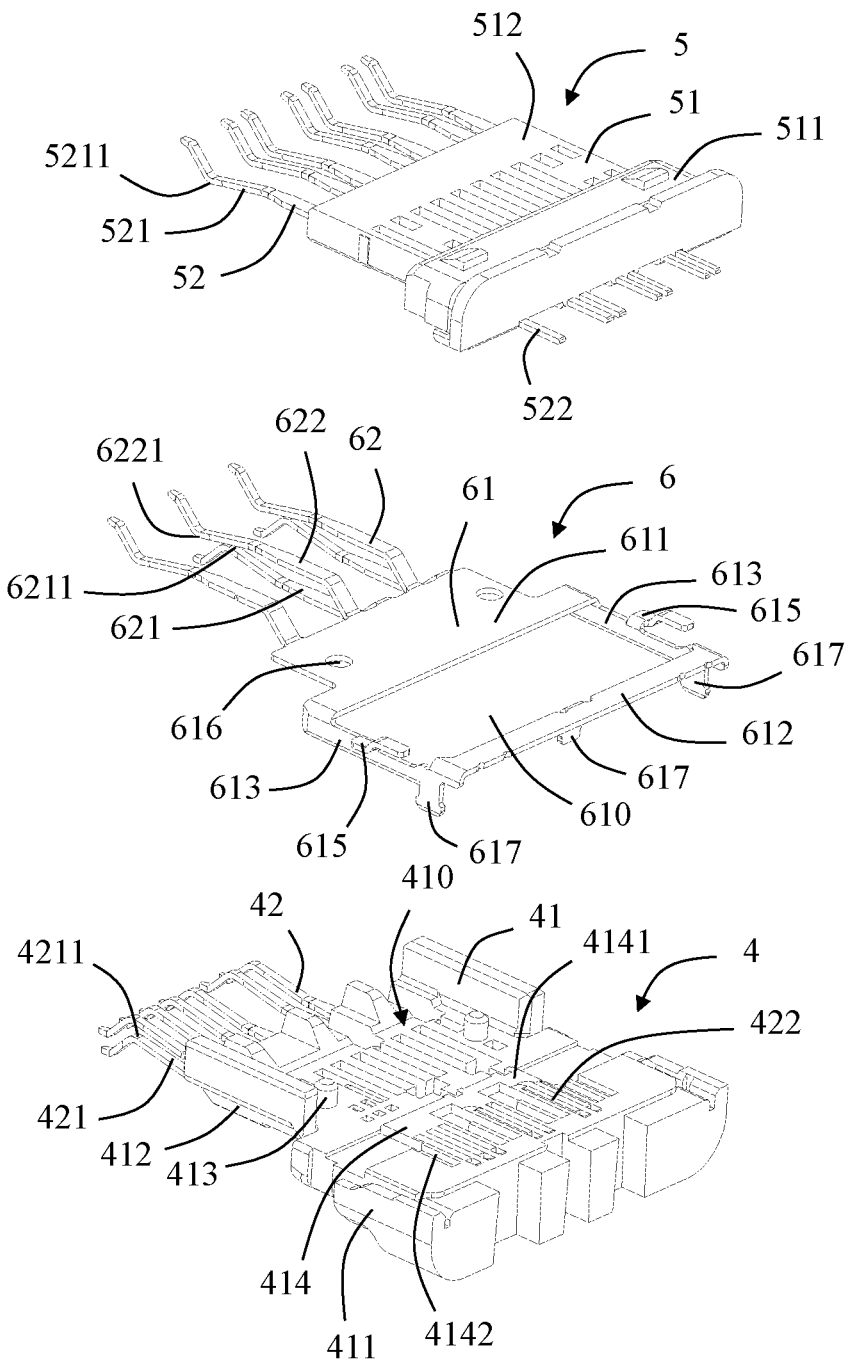
FIG. 11 is a further partial perspective exploded view of FIG. 9.
Figure 12:
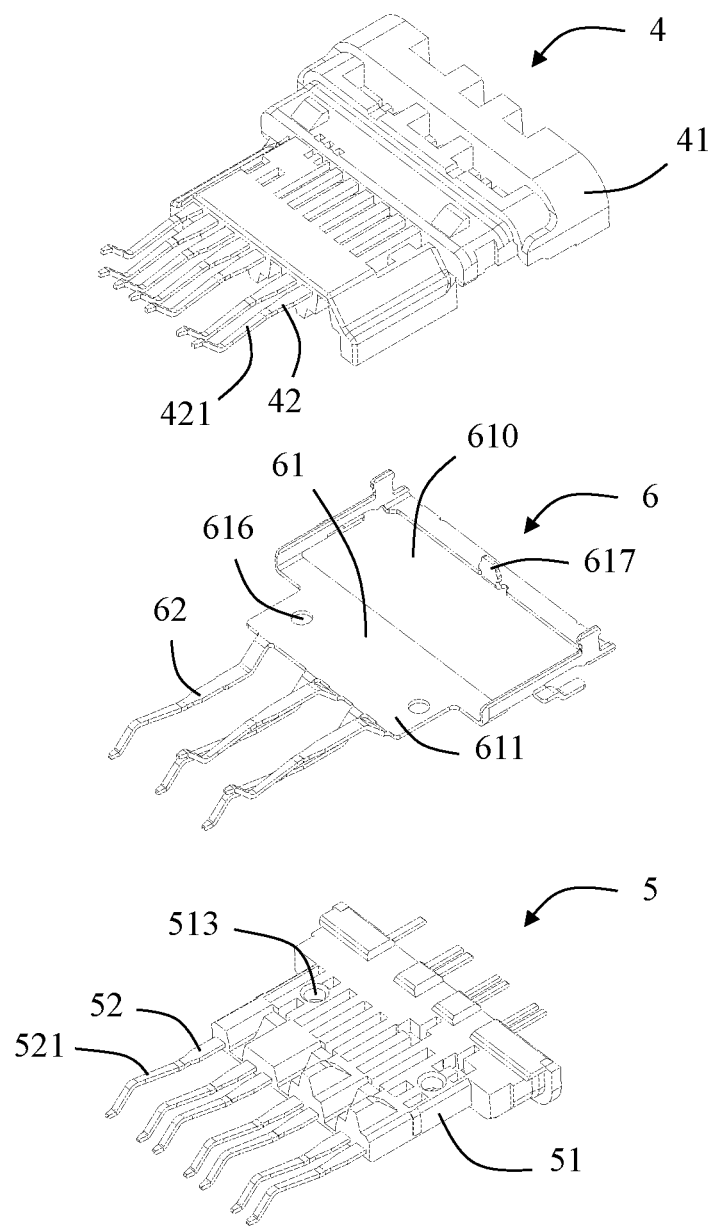
FIG. 12 is a partial perspective exploded view of FIG. 11 at another angle.
Figure 13:
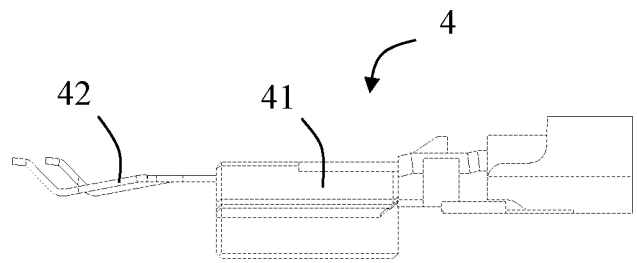
FIG. 13 is a left view of FIG. 12.
Figure 13:
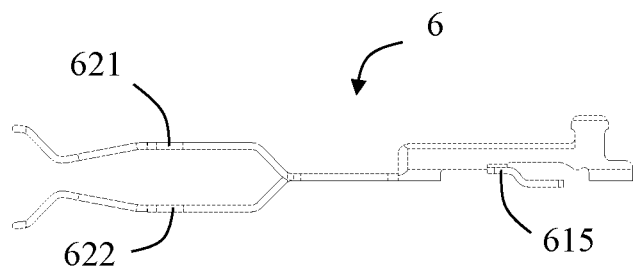
Figure 13:
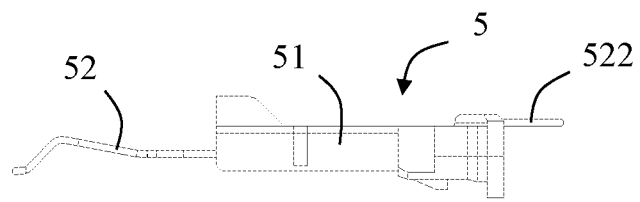
Figure 14:
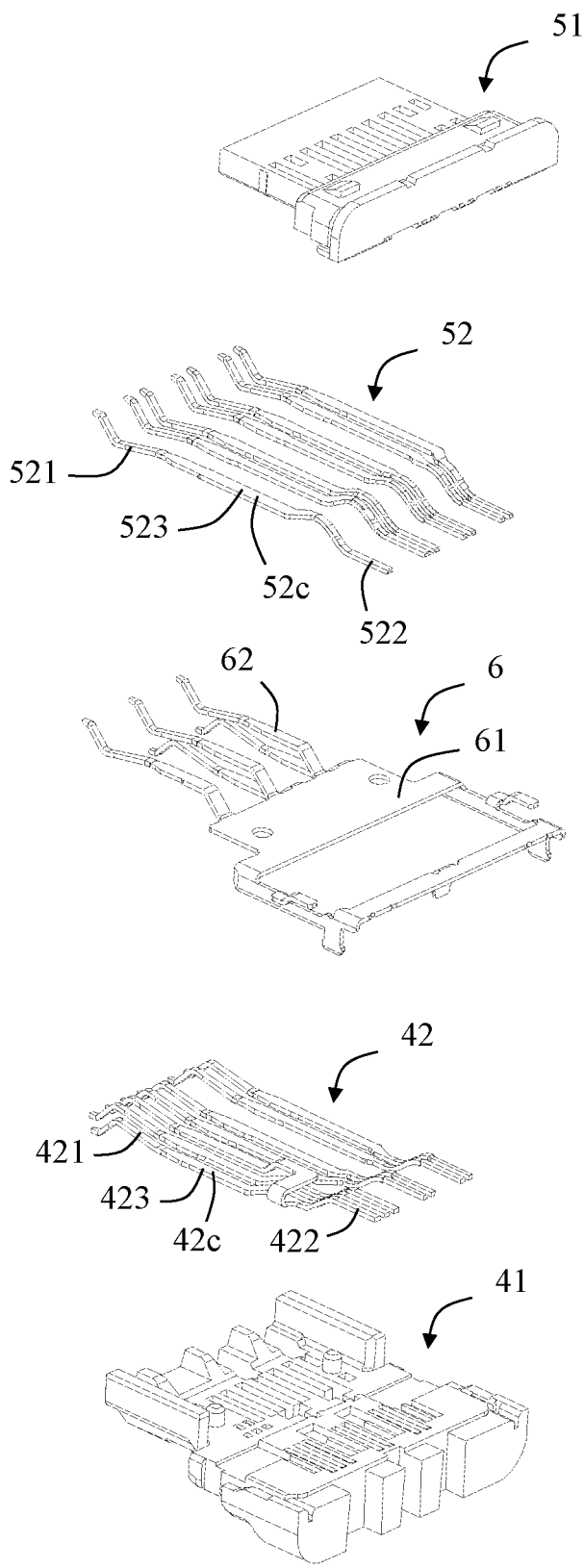
FIG. 14 is a further perspective exploded view of FIG. 11.
Figure 15:
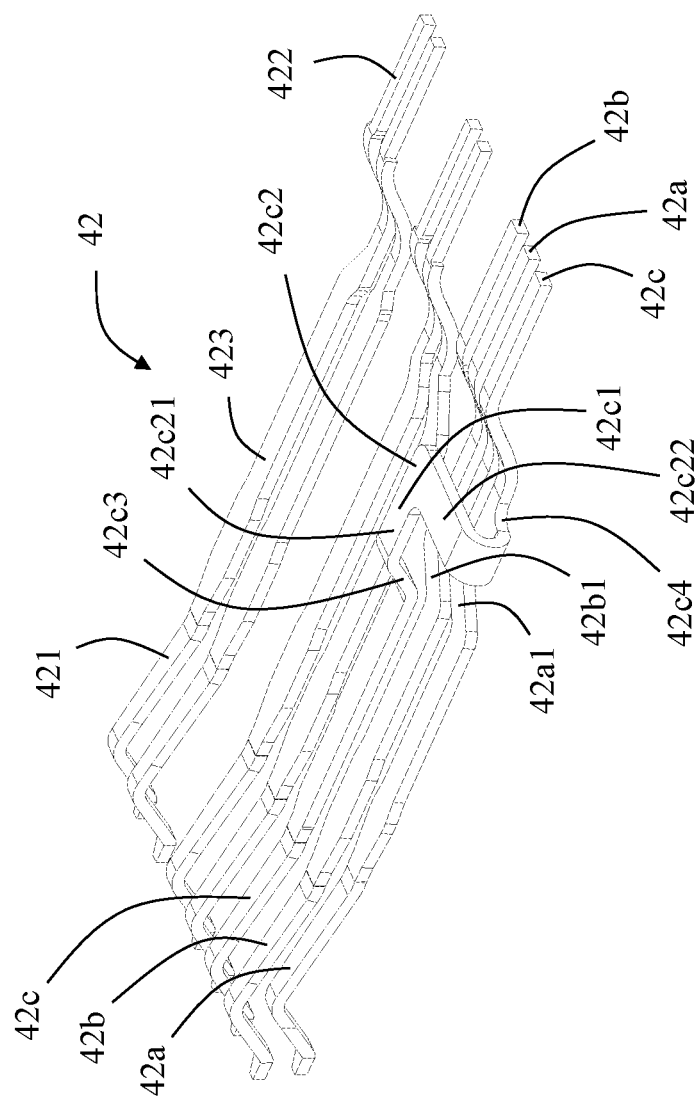
FIG. 15 is a schematic perspective view of a plurality of first conductive terminals in FIG. 14.
Figure 16:
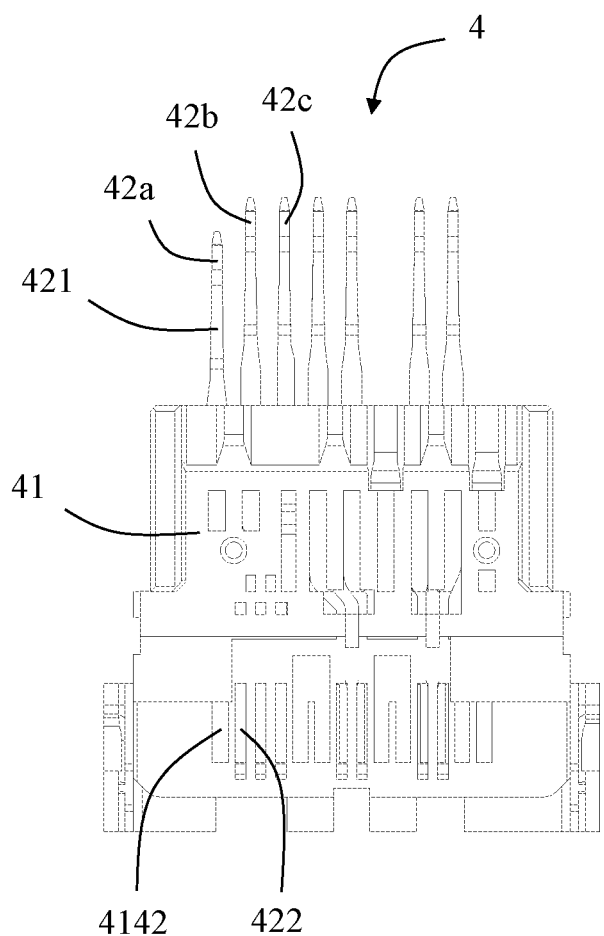
FIG. 16 is a top view of a first terminal module in FIG. 11.
Figure 17:
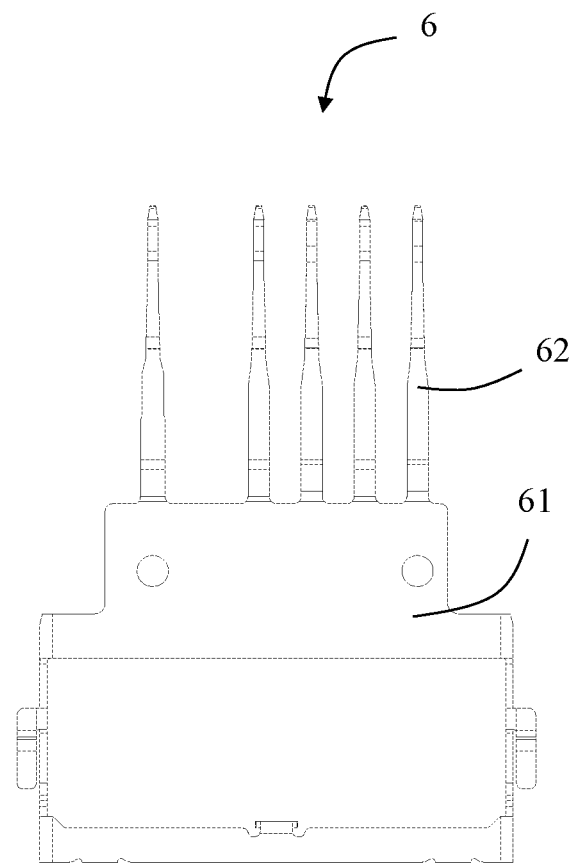
FIG. 17 is a top view of a shielding sheet in FIG. 11.
Figure 18:
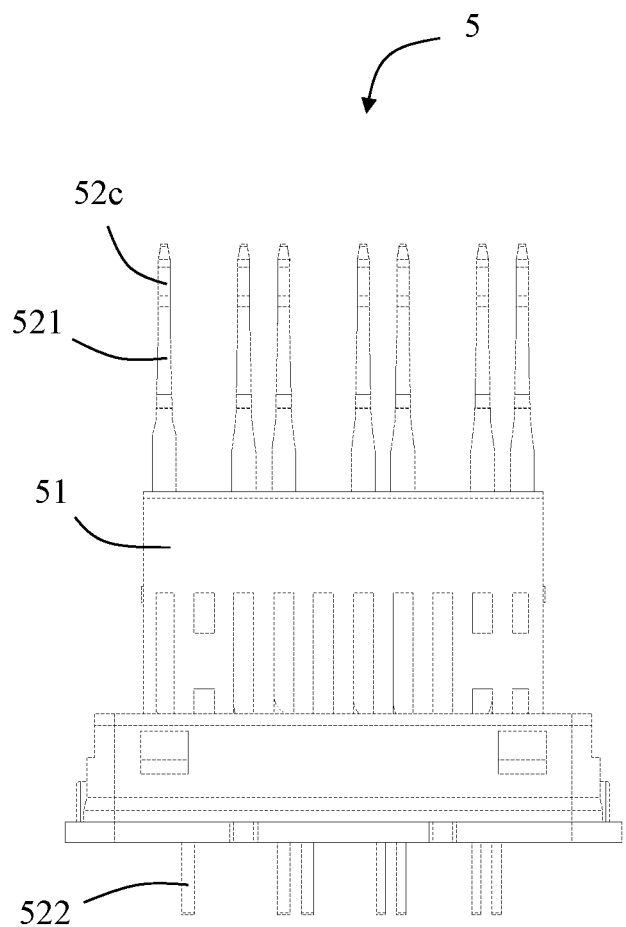
FIG. 18 is a top view of a second terminal module in FIG. 11.
Figure 19:
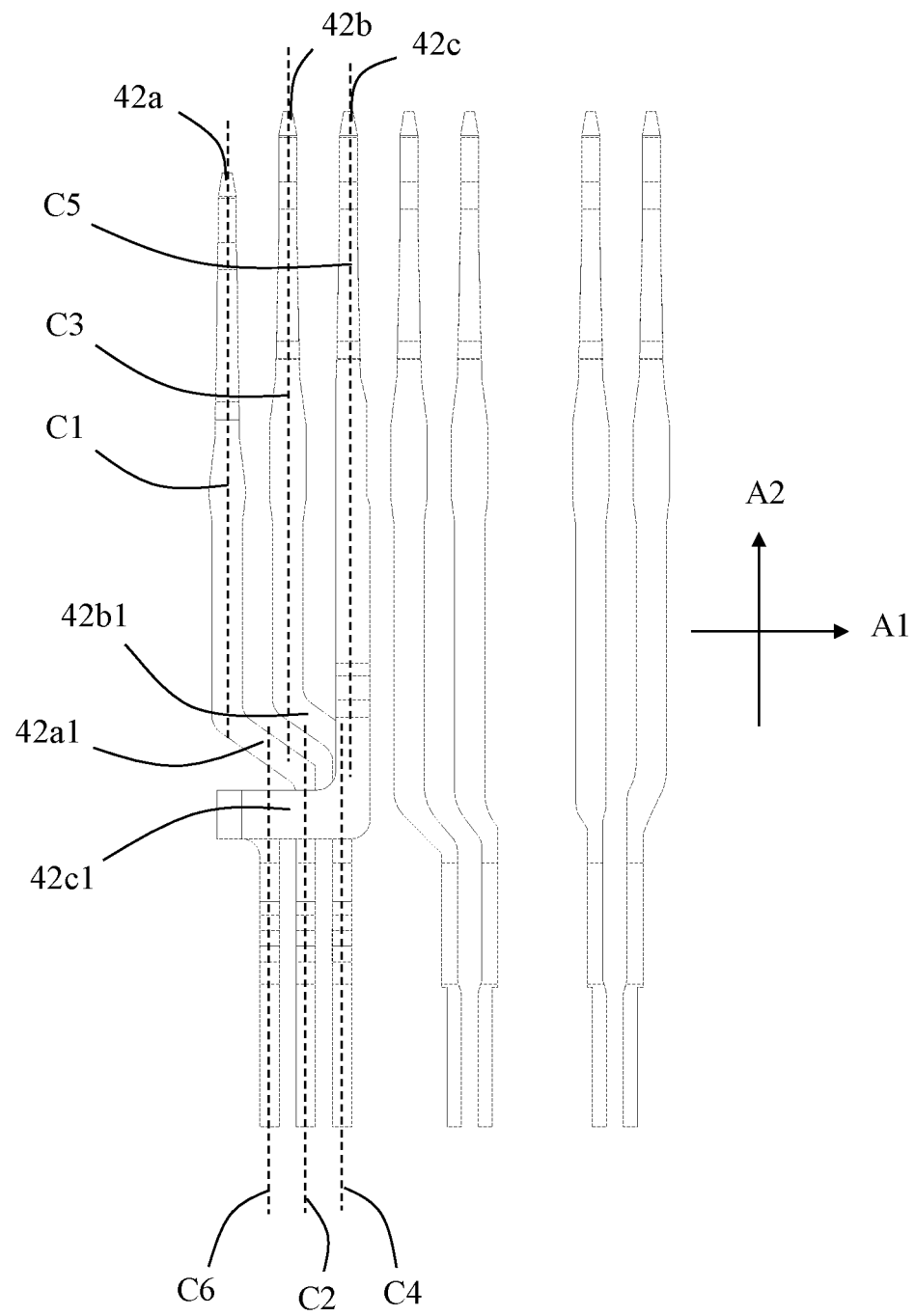
FIG. 19 is a top view of the plurality of first conductive terminals shown in FIG. 15.

Referring to FIGS. 1, 5 and 7, the insulating body 1 includes a mating surface 11, a mounting surface 12 opposite to the mating surface 11, a mating slot 110 extending forwardly through the mating surface 11, and an installation space 120 extending backwardly through the mounting surface 12 and communicating with the mating slot 110. The terminal module 2 is installed forwardly in the installation space 120 from the mounting surface 12. In addition, the insulating body 1 also defines a plurality of first terminal receiving grooves 13 communicating with the mating slot 110, and a plurality of second terminal receiving grooves 14 communicating with the mating slot 110. In the illustrated embodiment of the present disclosure, the first terminal receiving grooves 13 and the second terminal receiving grooves 14 are respectively located on opposite sides (for example, a lower side and a top side) of the mating slot 110 along a thickness direction of the insulating body 1. The first terminal receiving grooves 13 and the second terminal receiving grooves 14 are misaligned along the thickness direction of the insulating body 1 (as shown in FIG. 3 and FIG. 5). In the illustrated embodiment of the present disclosure, the first terminal receiving grooves 13 and the second terminal receiving grooves 14 further extend forwardly through the mating surface 11. Such an arrangement can make the first terminal receiving grooves 13 and the second terminal receiving grooves 14 longer, so as to provide better heat dissipation for the conductive terminals of the terminal module 2.

Figure 2:
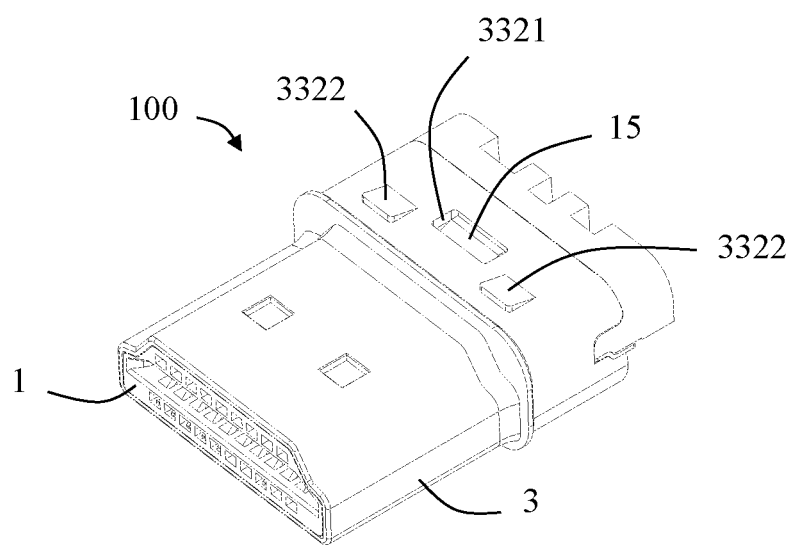
FIG. 2 is a schematic perspective view of FIG. 1 at another angle.

Referring to FIGS. 1, 2 and 7, in the illustrated embodiment of the present disclosure, the insulating body 1 is also provided with a first locking protrusion 15 locked in the first locking hole 3321, and a second locking protrusion 16 locked in the second locking hole 3311, so as to fix the insulating body 1 to the metal shell 3.

Referring to FIGS. 7 to 19, the terminal module 2 includes a first terminal module 4, a second terminal module 5, and a shielding sheet 6 is at least partially clamped between the first terminal module 4 and the second terminal module 5.

Referring to FIGS. 9 to 15, the first terminal module 4 includes a first insulating block 41 and a plurality of first conductive terminals 42 fixed to the first insulating block 41. In the illustrated embodiment of the present disclosure, the plurality of first conductive terminals 42 are insert-molded with the first insulating block 41. Of course, in other embodiments, the plurality of first conductive terminals 42 may also be fixed to the first insulating block 41 by assembling.

Similarly, the second terminal module 5 includes a second insulating block 51 and a plurality of second conductive terminals 52 fixed to the second insulating block 51. In the illustrated embodiment of the present disclosure, the plurality of second conductive terminals 52 are insert-molded with the second insulating block 51. Of course, in other embodiments, the plurality of second conductive terminals 52 may also be fixed to the second insulating block 51 by assembling.

The first insulating block 41 includes a first base portion 411 and a first protruding portion 412 extending forwardly from the first base portion 411. The first protruding portion 412 defines a receiving space 410 for receiving the second insulating block 51, and a plurality of positioning posts 413 extending into the receiving space 410. The first base portion 411 is provided with a boss 414. The boss 414 has an assembly surface 4141 and a plurality of receiving grooves 4142 recessed from the assembly surface 4141.

Each first conductive terminal 42 is provided with a first elastic arm 421 protruding beyond the first insulating block 41, a first tail portion 422 opposite to the first elastic arm 421, and a first fixing portion 423 connecting the first elastic arm 421 and the first tail portion 422. The first elastic arm 421 is cantilever-shaped and extends into the mating slot 110. The first elastic arm 421 is provided with a first contact portion 4211 for electrically mating with the mating connector. In the illustrated embodiment of the present disclosure, a rear end of the first elastic arm 421 is fixed in the first insulating block 41. A front end of the first tail portion 422 is also fixed in the first insulating block 41.

The plurality of first conductive terminals 42 include a first terminal 42a, a second terminal 42b and a third terminal 42c. The first elastic arm 421 of the first terminal 42a, the first elastic arm 421 of the second terminal 42b and the first elastic arm 421 of the third terminal 42c are sequentially disposed along a first direction A1. The first fixing portion 423 of the third terminal 42c includes a deflection portion 42c1 straddling the first fixing portion 423 of the first terminal 42a and the first fixing portion 423 of the second terminal 42b. The first tail portion 422 of the third terminal 42c, the first tail portion 422 of the first terminal 42a and the first tail portion 422 of the second terminal 42b are sequentially disposed along the first direction A1.

Specifically, the first fixing portion 423 of the first terminal 42a includes a first deflecting portion 42a1. The first fixing portion 423 of the second terminal 42b includes a second deflecting portion 42b1. The deflection portion 42c1 of the third terminal 42c straddles the first deflecting portion 42a1 and the second deflecting portion 42b1 in a direction opposite to the first direction A1.

The deflection portion 42c1 includes an elevated portion 42c2 higher than the first deflecting portion 42a1 and the second deflecting portion 42b1. In the illustrated embodiment of the present disclosure, the elevated portion 42c2 is L-shaped. The elevated portion 42c2 includes a first extension portion 42c21 and a second extension portion 42c22. The deflection portion 42c1 further includes a first inclined portion 42c3 connecting the first elastic arm 421 of the first terminal 42a and the first extension portion 42c21. The first fixing portion 423 of the third terminal 42c further includes a bent portion 42c4 bent downwardly from the second extension portion 42c22 and along the first direction A1.

The first elastic arm 421 of the first terminal 42a has a first centerline C1. The first tail portion 422 of the first terminal 42a has a second centerline C2. The first centerline C1 is misaligned with the second centerline C2. The first elastic arm 421 of the second terminal 42b has a third centerline C3. The first tail portion 422 of the second terminal 42b has a fourth centerline C4. The third centerline C3 is misaligned with the fourth centerline C4. The first elastic arm 421 of the third terminal 42c has a fifth centerline C5. The first tail portion 422 of the third terminal 42c has a sixth centerline C6. The fifth centerline C5 is misaligned with the sixth centerline C6.

In the illustrated embodiment of the present disclosure, the sixth centerline C6 is located between the first centerline C1 and the third centerline C3 along the first direction A1. The second centerline C2 is located between the third centerline C3 and the fifth centerline C5 along the first direction A1. The fourth centerline C4 is located between the third centerline C3 and the fifth centerline C5 along the first direction A1. Such an arrangement facilitates the arrangement of the first terminal 42a, the second terminal 42b and the third terminal 42c.

The second insulating block 51 includes a second base portion 511 and a second protruding portion 512 extending forwardly from the second base portion 511. The second protruding portion 512 is received in the receiving space 410 of the first insulating block 41. The second base portion 511 is provided with a plurality of positioning holes 513 to receive the positioning posts 413.

Each second conductive terminal 52 is provided with a second elastic arm 521 protruding beyond the second insulating block 51, a second tail portion 522 opposite to the second elastic arm 521, and a second fixing portion 523 connecting the second elastic arm 521 and the second tail portion 522. The second elastic arm 521 is cantilever-shaped and extends into the mated slot 110. The second elastic arm 521 is provided with a second contact portion 5211 for electrically mating with the mating connector. In the illustrated embodiment of the present disclosure, a rear end of the second elastic arm 521 is fixed in the second insulating block 51. A front end of the second tail portion 522 is also fixed in the second insulating block 51.

The plurality of second conductive terminals 52 includes a fourth terminal 52c adjacent to the first terminal 42a. The fourth terminal 52c is located on the outermost side of the plurality of second conductive terminals 52. The second tail portion 522 of the fourth terminal 52c is adjacent to the first tail portion 422 of the third terminal 42c, and is located on the outermost side in the first direction A1. In an application of the present disclosure, the fourth terminal 52c and the third terminal 42c form a pair to be electrically connected to corresponding cables.

The first contact portions 4211 and the second contact portions 5211 extend toward the middle. That is, the first contact portions 4211 protrude toward the second contact portions 5211, and the second contact portions 5211 protrude toward the first contact portions 4211. With such an arrangement, the first contact portions 4211 and the second contact portions 5211 can jointly clamp a tongue plate (not shown) of the mating connector. The second tail portions 522 extend backward beyond the second insulating block 51. In the illustrated embodiment of the present disclosure, the first tail portions 422 of the first conductive terminals 42 and the second tail portions 522 of the second conductive terminals 52 are flat-shaped. The first tail portions 422 of the first conductive terminals 42 and the second tail portions 522 of the second conductive terminals 52 are located on a same side. In the illustrated embodiment of the present disclosure, the first tail portions 422 of the first conductive terminals 42 and the second tail portions 522 of the second conductive terminals 52 are exposed on the assembly surface 4141 to facilitate fixing with the cables by soldering or welding.

The first tail portions 422 of the plurality of first conductive terminals 42 and the second tail portions 522 of the plurality of second conductive terminals 52 are arranged in a row along the first direction A1. The first tail portion 422 of the third terminal 42c is located on an outermost side of the row. The first elastic arm 421 of the second terminal 42b and the first elastic arm 421 of the third terminal 42c extend beyond the first elastic arm 421 of the first terminal 42a along a second direction A2. The second direction A2 is perpendicular to the first direction A1.

In the illustrated embodiment of the present disclosure, the shielding sheet 6 is made of metal material and has a one-piece structure. The shielding sheet 6 is provided with a main body 61 located between the plurality of first conductive terminals 42 and the plurality of second conductive terminals 52, and a plurality of grounding elastic arms 62 extending from the main body 61. The main body 61 is of a frame-shaped configuration, which includes a first wall portion 611, a second wall portion 612 opposite to the first wall portion 611, a third wall portion 613 connecting one end of the first wall portion 611 and one end of the second wall portion 612, a fourth wall portion 614 connecting the other end of the first wall portion 611 and the other end of the second wall portion 612, and an opening 610 enclosed by the first wall portion 611, the second wall portion 612, the third wall portion 613 and the fourth wall portion 614. The opening 610 is sleeved on the boss 414. The third wall portion 613 and/or the fourth wall portion 614 is provided with an abutting tab 615. The first wall portion 611 defines a plurality of through holes 616 through which the positioning posts 413 extend. In the illustrated embodiment of the present disclosure, both the third wall portion 613 and the fourth wall portion 614 are provided with the abutting tab 615. The abutting tab 615 of the third wall portion 613 is received in the first notch 3331 of the metal shell 3 and abuts against the first side wall portion 333. The abutting tab 615 of the fourth wall portion 614 is received in the second notch 3341 of the metal shell 3 and abuts against the second side wall portion 334. With such an arrangement, the shielding sheet 6 and the metal shell 3 can be connected as a whole, thereby increasing the grounding area and improving the shielding effect. The second wall portion 612, the third wall portion 613 and the fourth wall portion 614 are further provided with fixing tabs 617 for assembling and fixing the shielding sheet 6 to the first insulating block 41. Preferably, each fixing tab 617 is provided with a plurality of barbs, so as to improve the fixing effect with the first insulating block 41.

The plurality of grounding elastic arms 62 include a plurality of first grounding elastic arms 621 disposed in a same row (for example, a lower row) with the first elastic arms 421, and a plurality of second grounding elastic arms 622 disposed in a same row (for example, an upper row) with the second elastic arms 521. In the illustrated embodiment of the present disclosure, the first grounding elastic arm 621 and the second grounding elastic arm 622 are disposed along a width direction of the insulating housing 1. Inclination directions of the first grounding elastic arm 621 and the second grounding elastic arm 622 are different (see FIG. 13). The first grounding elastic arm 621 includes a first abutting portion 6211 extending into the mating slot 110. The second grounding elastic arm 622 includes a second abutting portion 6221 extending into the mating slot 110.

The first insulating block 41 and the second insulating block 51 are provided with buckling structures mating with each other, so as to clamp at least part of the main body 61 between the first insulating block 41 and the second insulating block 51. In the illustrated embodiment of the present disclosure, the buckling structures include but not limited to the positioning posts 413 and the positioning holes 513.

The assembly method of the terminal module 2 of the present disclosure is as follows: Firstly, the first conductive terminals 42 are insert-molded with the first insulating block 41 to form the first terminal module 4; and the second conductive terminals 52 are insert-molded with the second insulating block 51 to form the second terminal module 5. Secondly, the shielding sheet 6 is mounted on the first terminal module 4; wherein, the through holes 616 of the main body 61 are sleeved on the positioning posts 413. At this time, the opening 610 is sleeved on the boss 416. Finally, the first terminal module 4 and the second terminal module 5 are assembled together to form a whole. The main body 61 is located between the first insulating block 41 and the second insulating block 51 in the thickness direction of the insulating body 1. The second tail portions 522 is received in the receiving grooves 4142. The main body 61 is located on a periphery of the first tail portions 422 and the second tail portions 522. That is, the first tail portions 422 and the second tail portions 522 are located in the opening 610 and are not in contact with the main body 61. The first tail portions 422 and the second tail portions 522 are exposed on the assembly surface 4141.

In the illustrated embodiment of the present disclosure, none of the plurality of first conductive terminals 42 and the plurality of second conductive terminals 52 includes a terminal having a grounding function. The terminals with grounding function (i.e., the grounding elastic arms 62) are all provided on the shielding sheet 6.

Referring to FIG. 8 to FIG. 14, the first tail portions 422 and the second tail portions 522 are interspersed and arranged in a row along the width direction of the insulating housing 1. Among the first tail portions 422 and the second tail portions 522 in this row, any adjacent two are two first tail portions 422, or two second tail portions 522, or one first tail portion 422 and one second tail portion 522. In other words, only the first tail portions 422 of the first conductive terminals 42 and the second tail portions 522 of the second conductive terminals 52 occupy a width of the boss 414 (that is, no other ground terminals occupy the width of the boss 414). With such an arrangement, under the development trend of the conductive terminals of the electrical connector becoming denser, the conductive terminals can be arranged in a more convenient manner to reduce the risk of short circuit between the conductive terminals. In addition, this design can also simplify the design and manufacture of the conductive terminals, and reduce the increase in material cost and manufacturing cost caused by the continuous widening of the tail portions of the conductive terminals to both sides.

In an embodiment of the present disclosure, each first tail portion 422 is used for being soldered or welded to a corresponding first signal cable 201. Each second tail portion 522 is used for being soldered or welded to a corresponding second signal cable 202. The second wall portion 612 of the main body 61 is used for being soldered or welded to a corresponding grounding cable 203. The cables 200 include the first signal cable 201, the second signal cable 202 and the ground cable 203.

In the present disclosure, by setting the integral shielding sheet 6, problems such as poor contact that may be caused by connecting each grounding terminal in series in the related art are avoided, and the grounding reliability is ensured. In addition, the shielding sheet 6 located between the first terminal module 4 and the second terminal module 5 greatly reduces mutual interference of signals between the upper and lower layers of the first conductive terminals 42 and the second conductive terminals 52 during data transmission, which is beneficial to improve high-frequency and high-fidelity signal transmission. By arranging the first tail portions 422 and the second tail portions 522 in a single row, the connection with the cables can be completed by one soldering or welding, thereby reducing the difficulty of soldering or welding, improving the reliability of soldering or welding, and improving the stability of performance, and the bad accumulation of multiple soldering or welding is avoided. In addition, based on the soldering or welding process adopted by this structure, it can be compatible with coaxial and twisted core wires at the same time, thereby expanding the scope of application.

In addition, the first fixing portion 423 of the third terminal 42c includes the deflection portion 42c1 straddling the first fixing portion 423 of the first terminal 42a and the first fixing portion 423 of the second terminal 42b, so that the arrangement order of the first tail portion 422 of the third terminal 42c, the first tail portion 422 of the first terminal 42a, and the first tail portion 422 of the second terminal 42b along the first direction A1 is different from that of the first elastic arm 421 of the first terminal 42a, the first elastic arm 421 of the second terminal 42b and the first elastic arm 421 of the third terminal 42c. As a result, the arrangement of the first terminal 42a, the second terminal 42b and the third terminal 42c is optimized.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:
    an insulating body comprising a mating surface, a mounting surface opposite to the mating surface, a mating slot extending through the mating surface, and an installation space extending through the mounting surface and communicating with the mating slot;
    a first terminal module, the first terminal module comprising a first insulating block and a plurality of first conductive terminals, each first conductive terminal comprising a first fixing portion fixed to the first insulating block, a first tail portion extending from one end of the first fixing portion, and a first elastic arm extending from another end of the first fixing portion; the first elastic arm being provided with a first contact portion extending into the mating slot;
    a second terminal module, the second terminal module comprising a second insulating block and a plurality of second conductive terminals, each second conductive terminal comprising a second fixing portion fixed to the second insulating block, a second tail portion extending from one end of the second fixing portion, and a second elastic arm extending from another end of the second fixing portion; the second elastic arm being provided with a second contact portion extending into the mating slot; the first contact portions of the plurality of first conductive terminals and the second contact portions of the second conductive terminals being located on opposite sides of the mating slot, respectively; and
    a shielding sheet, the shielding sheet comprising a main body and a plurality of grounding elastic arms extending from the main body, each grounding elastic arm comprising an abutting portion extending into the mating slot, the main body being at least partially clamped between the first insulating block and the second insulating block;
    wherein the plurality of first conductive terminals comprise a first terminal, a second terminal and a third terminal; the first elastic arm of the first terminal, the first elastic arm of the second terminal and the first elastic arm of the third terminal are disposed in sequence along a first direction; and the first fixing portion of the third terminal comprises a deflection portion straddling the first fixing portion of the first terminal and the first fixing portion of the second terminal, so that the first tail portion of the third terminal, the first tail portion of the first terminal and the first tail portion of the second terminal are disposed in sequence along the first direction.

2. The electrical connector according to claim 1, wherein the first fixing portion of the first terminal comprises a first deflecting portion; the first fixing portion of the second terminal comprises a second deflecting portion; and the deflection portion of the third terminal straddles the first deflecting portion and the second deflecting portion in a direction opposite to the first direction.

3. The electrical connector according to claim 2, wherein the deflection portion comprises an elevated portion higher than the first deflecting portion and the second deflecting portion.

4. The electrical connector according to claim 3, wherein the elevated portion is L-shaped; the elevated portion comprises a first extension portion and a second extension portion; the deflection portion further comprises a first inclined portion connecting the first elastic arm of the first terminal and the first extension portion; the first fixing portion of the third terminal further comprises a bent portion bent downwardly from the second extension portion and along the first direction.

5. The electrical connector according to claim 1, wherein the first elastic arm of the first terminal has a first centerline; the first tail portion of the first terminal has a second centerline; and the first centerline is misaligned with the second centerline;
wherein the first elastic arm of the second terminal has a third centerline; the first tail portion of the second terminal has a fourth centerline; and the third centerline is misaligned with the fourth centerline; and
wherein the first elastic arm of the third terminal has a fifth centerline; the first tail portion of the third terminal has a sixth centerline; and the fifth centerline is misaligned with the sixth centerline.

6. The electrical connector according to claim 5, wherein the sixth centerline is located between the first centerline and the third centerline along the first direction; the second centerline is located between the third centerline and the fifth centerline along the first direction; and the fourth centerline is located between the third centerline and the fifth centerline along the first direction.

7. The electrical connector according to claim 1, wherein the first tail portions of the plurality of first conductive terminals and the second tail portions of the plurality of second conductive terminals are located on a same side and disposed in a row along the first direction; and the first tail portion of the third terminal is located on an outermost side of the row.

8. The electrical connector according to claim 1, wherein the first elastic arm of the second terminal and the first elastic arm of the third terminal extend beyond the first elastic arm of the first terminal along a second direction; and the second direction is perpendicular to the first direction.

9. The electrical connector according to claim 1, wherein the main body is of a frame-shaped configuration; the main body comprises a first wall portion, a second wall portion opposite to the first wall portion, a third wall portion connecting one end of the first wall portion and one end of the second wall portion, a fourth wall portion connecting another end of the first wall portion and another end of the second wall portion, and an opening enclosed by the first wall portion, the second wall portion, the third wall portion and the fourth wall portion; and
wherein the first tail portions of the plurality of first conductive terminals and the second tail portions of the plurality of second conductive terminals are located in the opening.

10. The electrical connector according to claim 9, further comprising a plurality cables; wherein part of the plurality of cables are connected to the first tail portions; part of the plurality of cables are connected to the second tail portions; and part of the plurality of cables is connected to the second wall portion.

11. The electrical connector according to claim 9, wherein the third wall portion and/or the fourth wall portion is provided with an abutting tab; and
the electrical connector further comprises a metal shell sleeved on the insulating body, and the abutting tab is in contact with the metal shell.

12. The electrical connector according to claim 1, wherein the plurality of first conductive terminals are insert-molded with the first insulating block; the plurality of second conductive terminals are insert-molded with the second insulating block; one of the first insulating block and the second insulating block is provided with a positioning post and a remaining one of the first insulating block and the second insulating block is provided with a positioning hole to receive the positioning post.

13. An electrical connector, comprising:
an insulating body comprising a mating surface and a mating slot extending through the mating surface;
a first terminal module, the first terminal module comprising a first insulating block and a plurality of first conductive terminals, each first conductive terminal comprising a first fixing portion fixed to the first insulating block, a first tail portion, and a first elastic arm; the first elastic arm being provided with a first contact portion extending into the mating slot;
a second terminal module, the second terminal module comprising a second insulating block and a plurality of second conductive terminals, each second conductive terminal comprising a second fixing portion fixed to the second insulating block, a second tail portion, and a second elastic arm; the second elastic arm being provided with a second contact portion extending into the mating slot; the first contact portions of the plurality of first conductive terminals and the second contact portions of the second conductive terminals being located on opposite sides of the mating slot, respectively; and
a shielding sheet, the shielding sheet comprising a main body and a plurality of grounding elastic arms extending from the main body, each grounding elastic arm comprising an abutting portion extending into the mating slot, the main body being at least partially located between the first insulating block and the second insulating block;
wherein the plurality of first conductive terminals comprise a first terminal, a second terminal and a third terminal; the first elastic arm of the first terminal, the first elastic arm of the second terminal and the first elastic arm of the third terminal are disposed in sequence along a first direction;
the first elastic arm of the second terminal extends beyond the first elastic arm of the first terminal along a second direction perpendicular to the first direction; the first elastic arm of the third terminal extends beyond the first elastic arm of the first terminal along the second direction; and the first elastic arm of the second terminal and the first elastic arm of the third terminal have a same length along the second direction; and
the first fixing portion of the third terminal comprises a deflection portion straddling the first fixing portion of the first terminal and the first fixing portion of the second terminal, so that the first tail portion of the third terminal, the first tail portion of the first terminal and the first tail portion of the second terminal are disposed in sequence along the first direction.

14. The electrical connector according to claim 13, wherein the first fixing portion of the first terminal comprises a first deflecting portion; the first fixing portion of the second terminal comprises a second deflecting portion; and the deflection portion of the third terminal straddles the first deflecting portion and the second deflecting portion in a direction opposite to the first direction.

15. The electrical connector according to claim 14, wherein the deflection portion comprises an elevated portion higher than the first deflecting portion and the second deflecting portion.

16. The electrical connector according to claim 15, wherein the elevated portion is L-shaped; the elevated portion comprises a first extension portion and a second extension portion; the deflection portion further comprises a first inclined portion connecting the first elastic arm of the first terminal and the first extension portion; the first fixing portion of the third terminal further comprises a bent portion bent downwardly from the second extension portion and along the first direction.

17. The electrical connector according to claim 13, wherein the first elastic arm of the first terminal has a first centerline; the first tail portion of the first terminal has a second centerline; and the first centerline is misaligned with the second centerline;

wherein the first elastic arm of the second terminal has a third centerline; the first tail portion of the second terminal has a fourth centerline; and the third centerline is misaligned with the fourth centerline; and wherein the first elastic arm of the third terminal has a fifth centerline; the first tail portion of the third terminal has a sixth centerline; and the fifth centerline is misaligned with the sixth centerline.

18. The electrical connector according to claim 17, wherein the sixth centerline is located between the first centerline and the third centerline along the first direction; the second centerline is located between the third centerline and the fifth centerline along the first direction; and the fourth centerline is located between the third centerline and the fifth centerline along the first direction.

19. The electrical connector according to claim 13, wherein the main body is of a frame-shaped configuration; the main body comprises a first wall portion, a second wall portion opposite to the first wall portion, a third wall portion connecting one end of the first wall portion and one end of the second wall portion, a fourth wall portion connecting another end of the first wall portion and another end of the second wall portion, and an opening enclosed by the first wall portion, the second wall portion, the third wall portion and the fourth wall portion; and wherein the first tail portions of the plurality of first conductive terminals and the second tail portions of the plurality of second conductive terminals are located in the opening.

20. The electrical connector according to claim 19, wherein the third wall portion and/or the fourth wall portion is provided with an abutting tab; and the electrical connector further comprises a metal shell sleeved on the insulating body, and the abutting tab is in contact with the metal shell.

* * * * *